US008087322B1

(12) United States Patent
Morris

(10) Patent No.: US 8,087,322 B1
(45) Date of Patent: Jan. 3, 2012

(54) TILT AND TURN ASSEMBLY

(76) Inventor: Eric D. Morris, Philadelphia, PA (US)

( * ) Notice: Subject to any disclaimer, the term of this patent is extended or adjusted under 35 U.S.C. 154(b) by 886 days.

(21) Appl. No.: 12/112,395

(22) Filed: Apr. 30, 2008

Related U.S. Application Data

(60) Provisional application No. 60/915,522, filed on May 2, 2007.

(51) Int. Cl.
*F16H 57/02* (2006.01)

(52) U.S. Cl. ........................................ 74/606 R; 49/246

(58) Field of Classification Search .................... 49/246, 49/339, 341, 247, 248, 249; 74/606 R
See application file for complete search history.

(56) References Cited

U.S. PATENT DOCUMENTS 1,095,682 A * 5/1914 Smyser ........................... 49/341
2,817,511 A * 12/1957 Reynaud ......................... 49/249
4,301,622 A * 11/1981 Dunsmoor ...................... 49/342
4,445,794 A * 5/1984 Sandberg ...................... 384/428
4,860,493 A * 8/1989 Lense ............................. 49/279
5,313,737 A * 5/1994 Midas ............................. 49/324
5,531,138 A * 7/1996 Vetter ......................... 74/606 R
5,839,229 A * 11/1998 Briggs et al. ..................... 49/246
5,937,582 A * 8/1999 Taylor ............................. 49/341
6,122,863 A * 9/2000 Tippin et al. ..................... 49/279
6,128,858 A * 10/2000 Vetter et al. ..................... 49/342
6,164,156 A * 12/2000 Purcell ............................ 74/547
6,374,544 B1 * 4/2002 Ellis ................................ 49/249
6,672,010 B1 * 1/2004 Gledhill et al. ................. 49/341
7,147,256 B2 * 12/2006 Gill ............................ 292/336.3
7,464,619 B2 * 12/2008 Vetter ............................. 74/396
2002/0066162 A1 * 6/2002 Klompenburg et al. ........ 16/429
2003/0029001 A1 * 2/2003 Klompenburg et al. ........ 16/429
2004/0216381 A1 * 11/2004 Clavet ............................. 49/342
2005/0212305 A1 * 9/2005 Gill ............................ 292/336.3
2007/0011948 A1 * 1/2007 Rangabasyam et al. ........ 49/395
2007/0234642 A1 * 10/2007 Bildahl et al. .................. 49/341
2007/0273162 A1 * 11/2007 Schultz ....................... 292/336.3
2008/0066382 A1 * 3/2008 Erickson .......................... 49/246
2010/0071266 A1 * 3/2010 Archambault .................. 49/327

* cited by examiner

*Primary Examiner* — Jerry Redman
(74) *Attorney, Agent, or Firm* — Caesar, Rivise, Bernstein, Cohen & Pokotilow, Ltd.

(57) ABSTRACT

A mechanism for a window is provided including a mechanism case, a spindle inserted into the case, a screw mounting plate for mounting the mechanism to a surface by a pair of screws, the screw mounting plate having an aperture through which the spindle in the case freely passes, a cover plate having an aperture through which the spindle freely passes and sized to substantially cover the mechanism and screw mounting plate, and a retaining ring for fixed engagement with the aperture of the screw mounting plate. The retaining ring has an internal aperture through which the spindle passes and provides for the spindle to freely rotate within the internal aperture. The retaining ring is incapable of passing through the aperture in the cover plate. The retaining ring secures the cover plate to the screw mounting plate and the screw mounting plate secures the mechanism case to the surface.

4 Claims, 7 Drawing Sheets

TILT AND TURN ASSEMBLY

CROSS-REFERENCE TO RELATED APPLICATION

This application claims the benefit of U.S. Provisional Application Ser. No. 60/915,522, entitled Tilt and Turn Assembly, filed May 2, 2007.

BACKGROUND OF THE INVENTION

The present invention relates to mechanisms for windows. More particularly, the present invention relates to mechanisms for tilt and turn windows that provide for improved aesthetics.

European tilt and turn windows are on the market. For example, Tischler and Sohn as well as other manufacturers make and sell such windows.

The present invention is directed to a new cover attachment system for the detent mechanism for a European style tilt and turn window. In most cases, the manufacturer of the window provides a cheap plastic, stamped brass or aluminum cover. The prior covers simply pop over the mechanism and are held in place by a lever. High end architectural door hardware manufacturers have started producing more stylish designs that match a particular period of door hardware or match other products in their lines. Aftermarket covers are also sold, typically by companies unrelated to those that manufacture the detent mechanism. The aftermarket covers all have exposed screws. These screws are the mounting screws for the detent mechanism as well as doing double duty as mounting screws for the cover as well. This is potentially problematic from a mechanical standpoint as the detent mechanism is subject to repeated twisting motion. The aftermarket covers are typically supplied with brass or bronze screws which are not as strong as the originally supplied steel screws. Exposed screws are typically less aesthetically pleasing than hidden screws.

There is a need for higher quality decorative covers, of, for example, bronze with ornamental surfaces where mounting screws having adequate strength are hidden.

BRIEF SUMMARY OF THE INVENTION

A mechanism for a window is provided which includes a mechanism case, a spindle inserted into the case and a screw mounting plate for mounting the mechanism to a surface by a pair of screws. The screw mounting plate has an aperture through which the spindle in the case freely passes. A cover plate is provided having an aperture through which the spindle freely passes and is sized to substantially cover the mechanism and screw mounting plate. A retaining ring is provided for fixed engagement with the aperture of the screw mounting plate. The retaining ring has an internal aperture through which the spindle passes and provides for the spindle to freely rotate within the internal aperture. The retaining ring is incapable of passing through the aperture in the cover plate. The retaining ring secures the cover plate to the screw mounting plate and the screw mounting plate secures the mechanism case to the surface.

In a more detailed embodiment, a tilt and turn mechanism for a tilt and turn window having tilt and turn gears is provided. The mechanism includes a detent mechanism case, a spindle having a square cross section inserted into tilt and turn gears in the detent mechanism case, and a screw mounting plate for mounting the detent mechanism by a pair of screws to a surface. The screw mounting plate has a threaded aperture through which the spindle passes. A decorative cover plate is provided having an aperture through which the spindle passes and is sized to substantially cover the detent mechanism and screw mounting plate. A retaining ring is provided having an exterior thread for engagement into the threaded aperture of the screw mounting plate and an internal aperture through which the spindle passes and providing for the spindle to freely rotate within the internal aperture. The retaining ring has a flange that is larger than the aperture in the decorative plate such that the retaining ring cannot pass through the aperture in the decorative plate. The retaining ring secures the decorative cover to the screw mounting plate by engagement of the threaded aperture of the screw mounting plate and the exterior thread of the retaining ring. The screw mounting plate secures the mechanism case to the surface.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
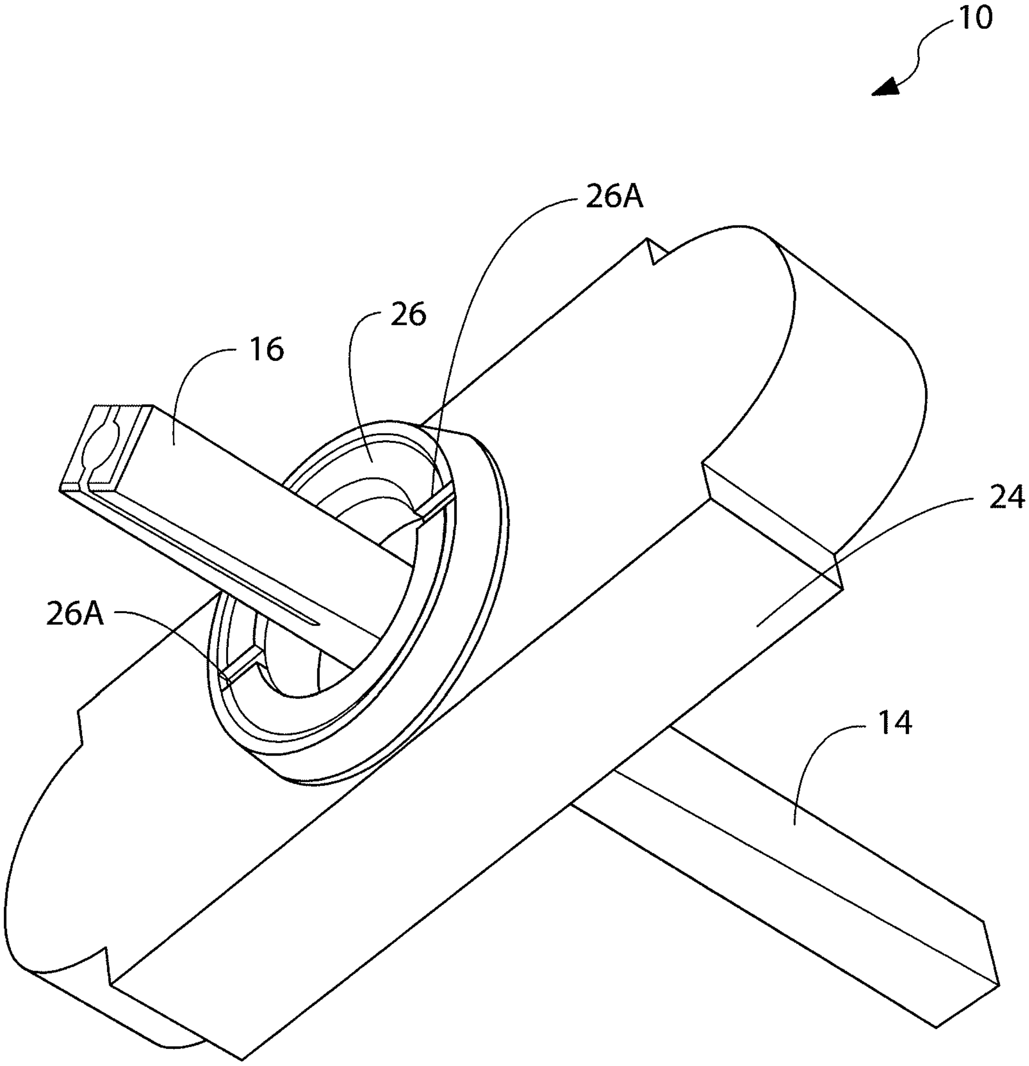
FIG. 1 is an isometric view of a tilt and turn assembly in accordance with a preferred embodiment of the present invention.
Figure 2:
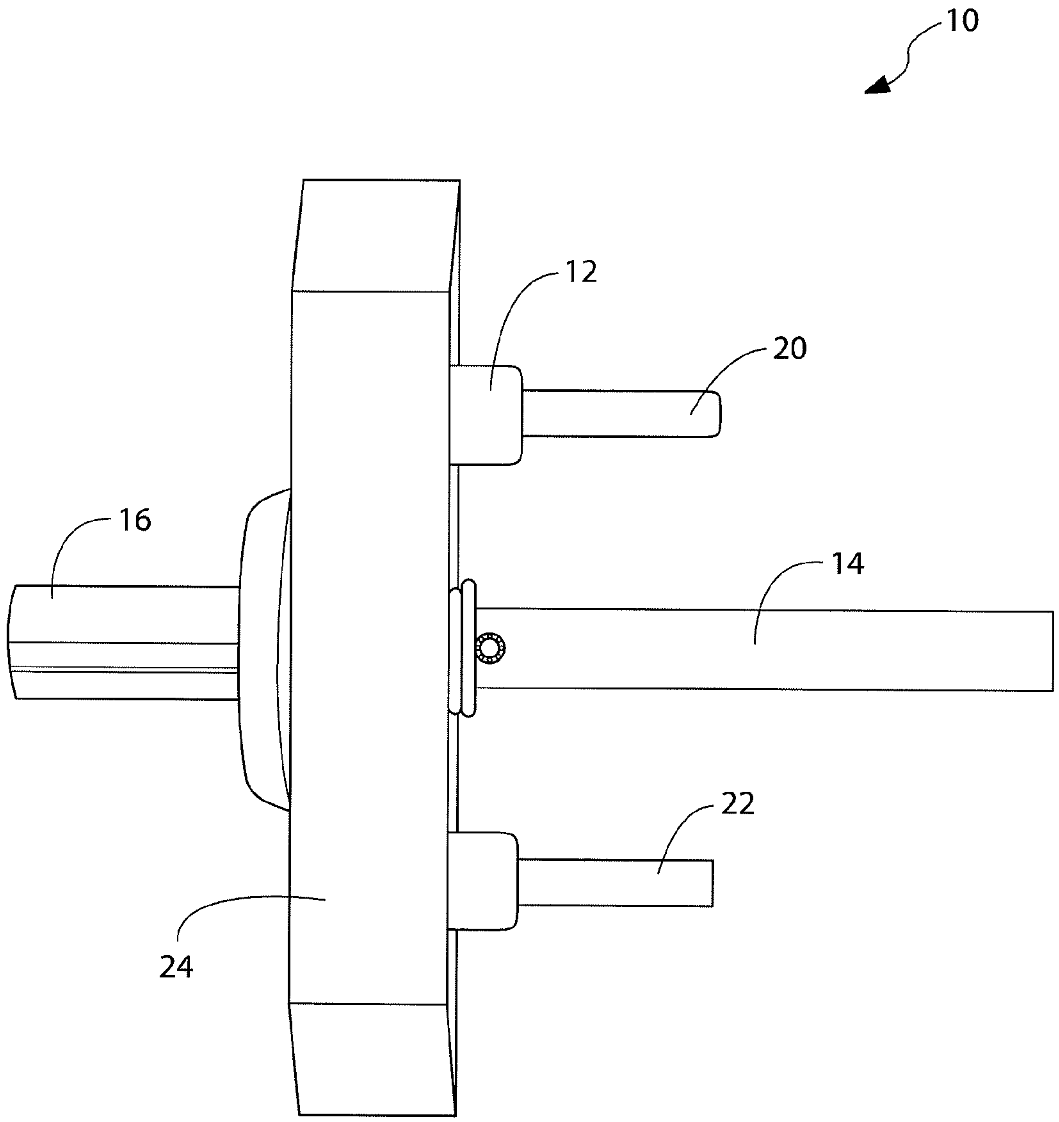
FIG. 2 is a side, elevation view of the tilt and turn assembly of FIG. 1.
Figure 3:
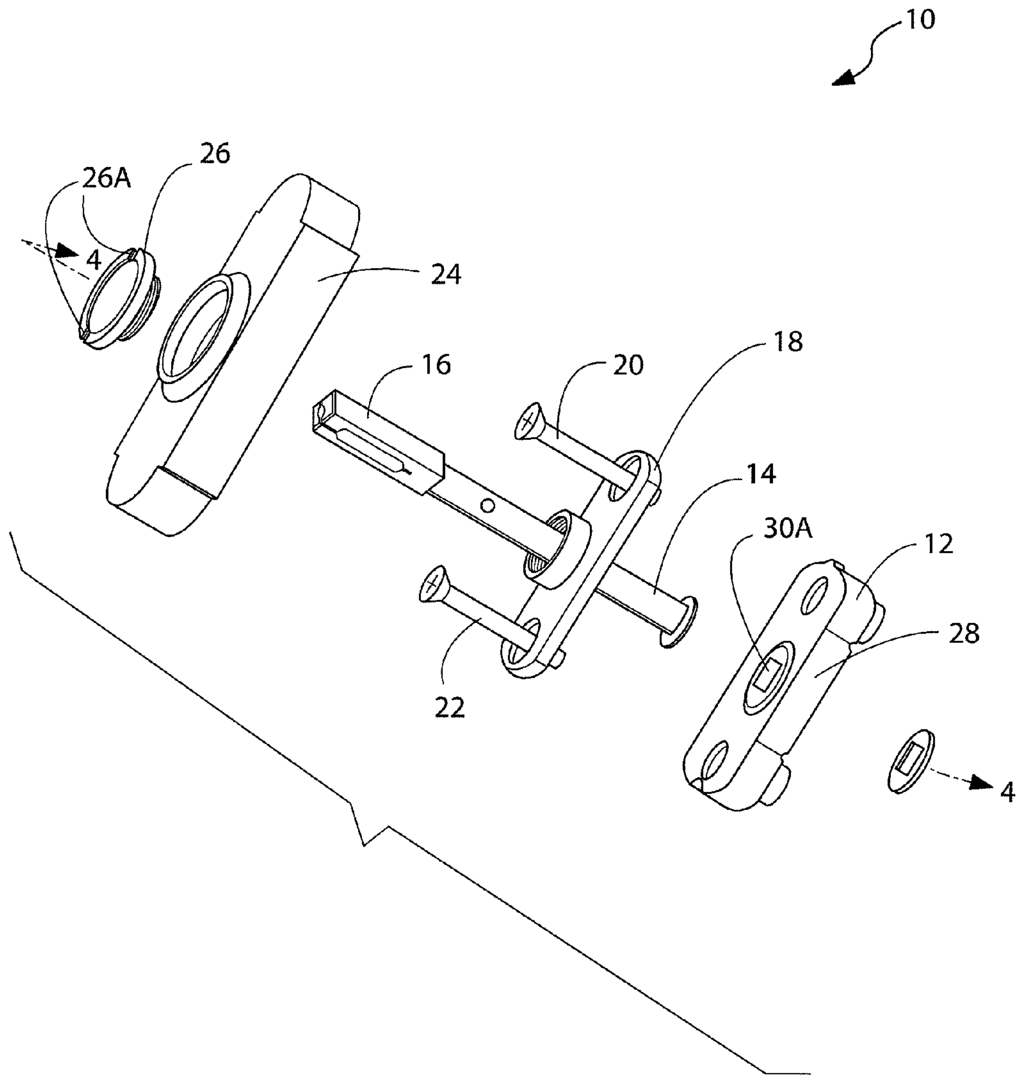
FIG. 3 is an exploded, isometric view of the tilt and turn assembly of FIG. 1.
Figure 4:
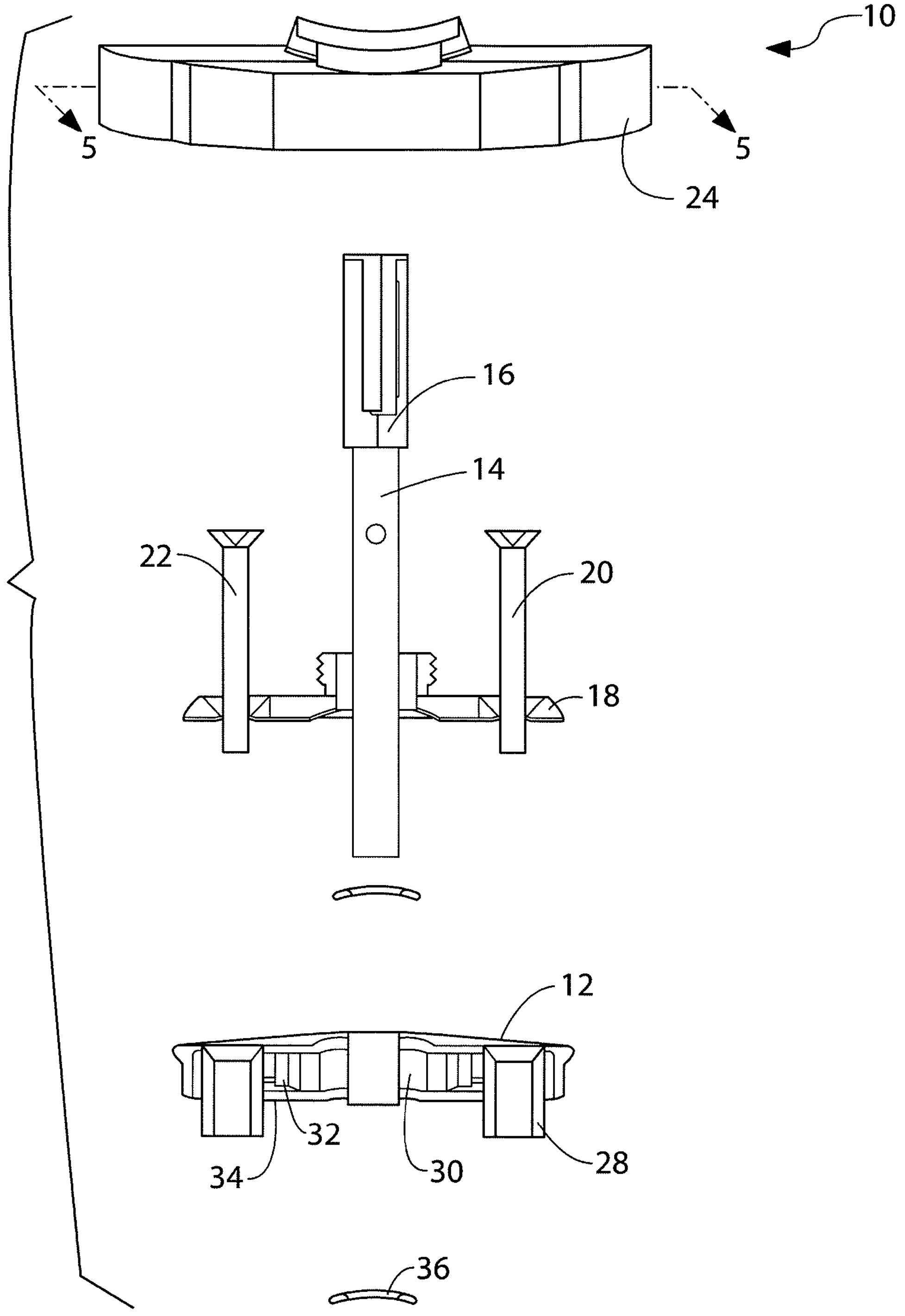
FIG. 4 is an exploded, cross-sectional, side view of the tilt and turn assembly of FIG. taken substantially along lines 4-4 of FIG. 3.

The invention will be illustrated in more detail with reference to the following embodiments, but it should be understood that the present invention is not deemed to be limited thereto.

The present invention is directed to a tilt and turn assembly having a very pleasing aesthetics due to its unique design. In the present invention, a decorative cover that hides the tilt and turn mechanism completely conceals the mechanism and the mounting screws. This invention leads to a more aesthetically pleasing product as well as allowing for the use of stronger steel screws.

Referring now to the drawing figures wherein like part numbers refer to like elements throughout the several views, there is shown in FIGS. 1-4 a tilt and turn mechanism 10 in accordance with a preferred embodiment of the present invention. The tilt and turn mechanism 10 includes a detent mechanism 12 that is installed on a door with the spindle 14 inserted into the tilt and turn gears mortised into the window sash (not shown, but well known in the art).

The spindle 14 is preferably designed so that it has a 7 mm square end that engages the tilt and turn gears (which require 7 mm square) and the detent mechanism 12. Preferably, the portion of the spindle 16 extending away from the face of the door is 7 min "on the diamond" so that it can engage any standard American lockset lever (rather than the European style of 8 mm "on the square"). This alleviates the need to stock specially broached 8 mm on the square levers and eliminates the possibility of special parts being mixed into the normal product in inventory. The standard spindle supplied by the manufacturer of the detent mechanism is typically 7 mm square on the door side and 8 mm square on the lever side. The manufacturer of the detent mechanism may be Jado Bathroom and Hardware Manufacturing Corp. These parts were originally manufactured for the European market, hence the 8 mm square portion of the spindle mates with the lever.

Figure 6:
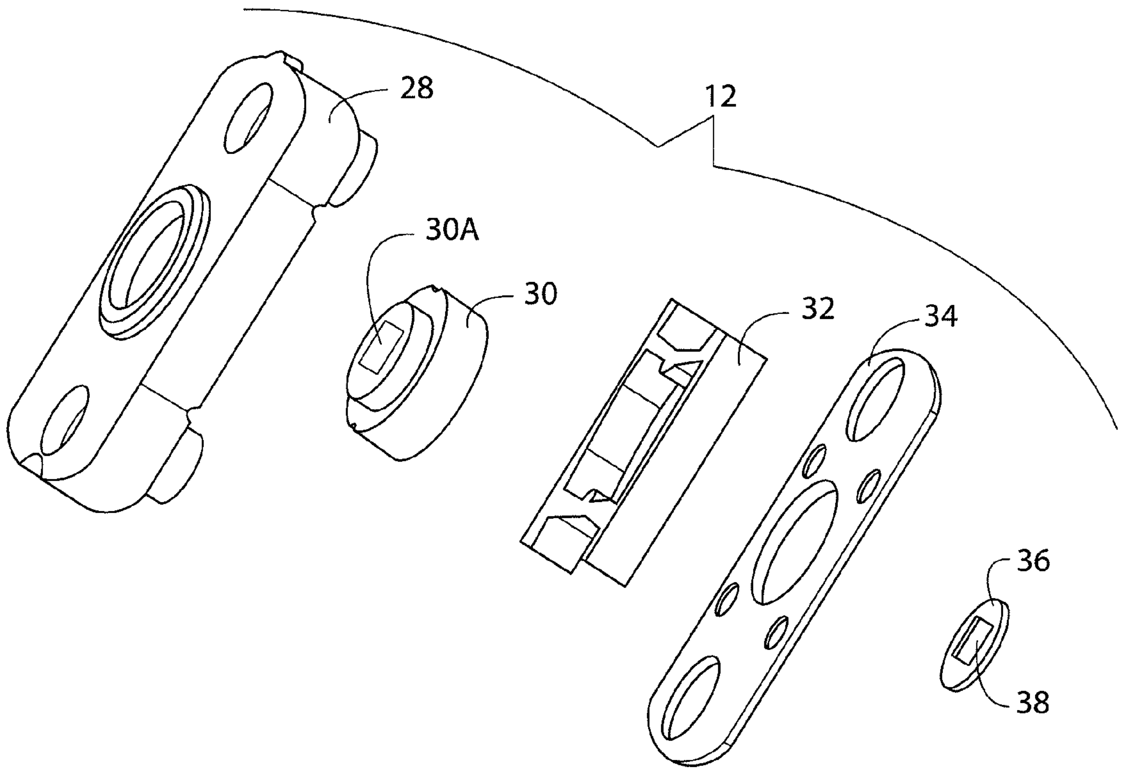
(Prior Art) FIG. 6
FIG. 6 is an exploded, isometric view of a prior art detent mechanism case for the tilt and turn assembly of FIG. 1.
Figure 7:
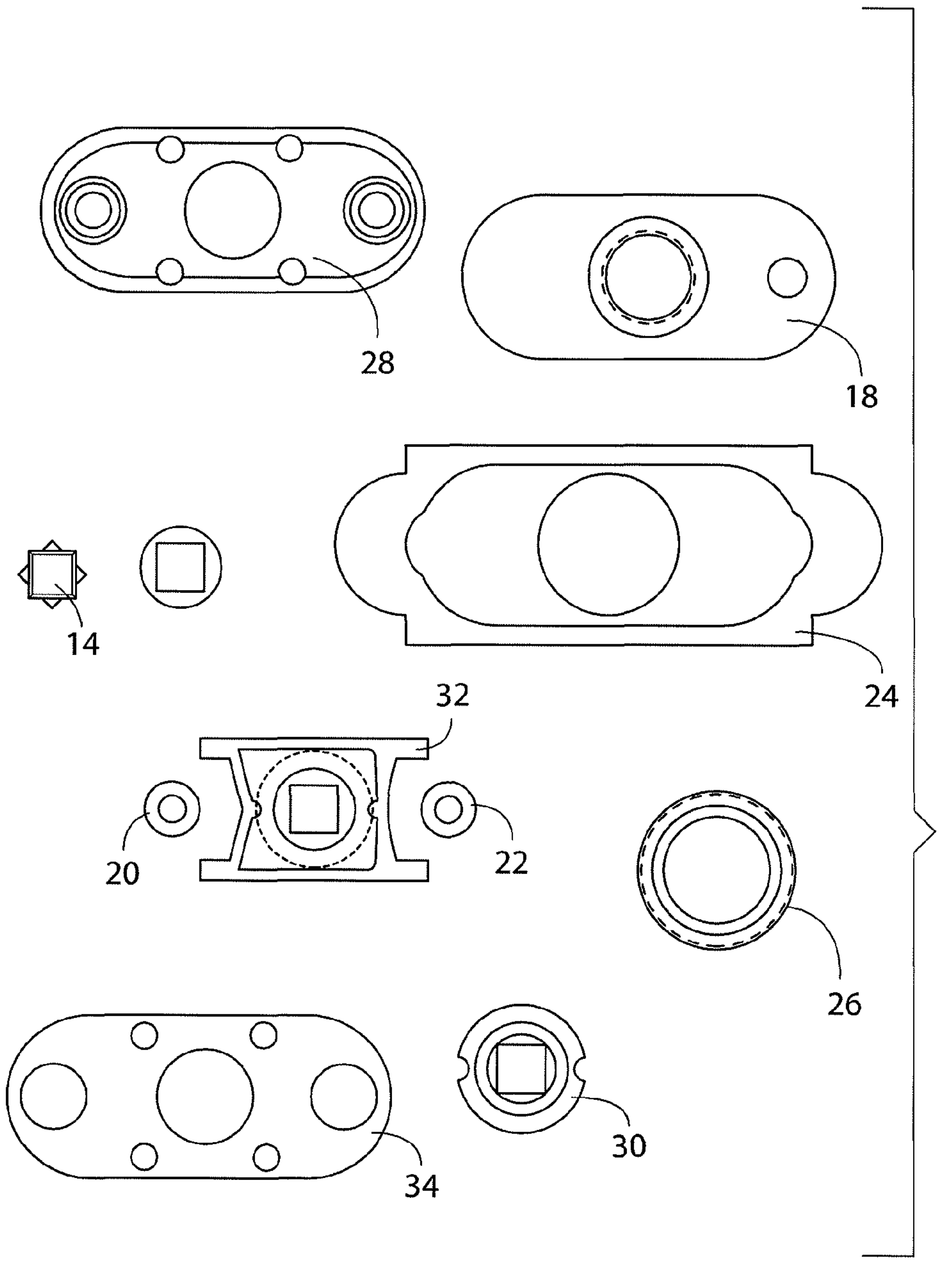
FIG. 7 a front, exploded view of the tilt and turn mechanism of FIG. 1.

The detent mechanism 12 is preferably a Jado detent assembly which is a pre-purchased subassembly. See FIG. 6. The detent mechanism 12 includes a mechanism case 28, a nylon hub 30 having a square aperture 30A, a detent plate 32, a cover plate 34 and a washer 36 having a square aperture 38 to fit the spindle 14. This particular detent mechanism 12 is not new.

Figure 5:
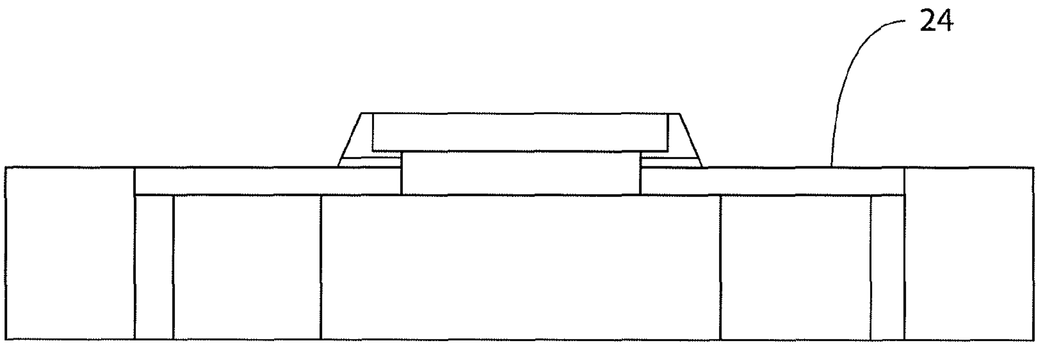
FIG. 5 is a cross sectional, side elevation view of a cover plate of the tilt and turn assembly of FIG. 1, taken substantially along lines 5-5 of FIG. 4.

After the detent mechanism 12 is located correctly, a tilt and turn mounting plate 18 is applied over the detent mechanism 12 and two steel screws 20, 22 are installed and tightened. A decorative cover plate 24 (see also FIG. 5) is then placed over the detent mechanism 12 and mounting plate 18 and this is secured with a retaining ring 26. Slots 26A in the retaining ring 26 are for tool assist when tightening or loosening the retaining ring 26 relative to the mounting plate 18. Then a lever (not shown) is installed as the last step on the spindle 14.

While the invention has been described in detail and with reference to specific embodiments thereof, it will be apparent to one skilled in the art that various changes and modifications can be made therein without departing from the spirit and scope thereof.

What is claimed is:

1. A mechanism for a window comprising:

(a) a mechanism case;

(b) a spindle, inserted into the case;

(c) a screw mounting plate for mounting the mechanism to a surface by a pair of screws, the screw mounting plate having an aperture through which the spindle in the case freely passes;

(d) a cover plate having an aperture through which the spindle freely passes and sized to substantially cover the mechanism and screw mounting plate; and (e) a retaining ring for fixed engagement with the aperture of the screw mounting plate, said retaining ring having an internal aperture through which the spindle passes and providing for the spindle to freely rotate within the internal aperture, the retaining ring incapable of passing through the aperture in the cover plate, the cover plate disposed between the retaining ring and the screw mounting plate, whereby the retaining ring secures the cover plate to the screw mounting plate and the screw mounting plate secures the mechanism case to the surface.

2. The mechanism of claim 1, wherein the mechanism is a tilt and turn mechanism for a window having a tilt and turn gears.

3. The mechanism of claim 2, wherein the spindle has a square cross section.

4. A tilt and turn mechanism for a tilt and turn window having tilt and turn gears, said mechanism comprising:

(a) a detent mechanism case;

(b) a spindle, having a square cross section, inserted into tilt and turn gears in the detent mechanism case;

(c) a screw mounting plate for mounting the detent mechanism by a pair of screws to a surface, the screw mounting plate having a threaded aperture through which the spindle passes;

(d) a decorative cover plate having an aperture through which the spindle passes and sized to substantially cover the detent mechanism and screw mounting plate; and (e) a retaining ring having an exterior thread for engagement into the threaded aperture of the screw mounting plate, and an internal aperture through which the spindle passes and providing for the spindle to freely rotate within the internal aperture, the retaining ring having a flange that is larger than the aperture in the decorative cover plate such that the retaining ring cannot pass through the aperture in the decorative cover plate, the decorative cover plate disposed between the retaining ring and the screw mounting plate, whereby the retaining ring secures the decorative cover plate to the screw mounting plate by engagement of the threaded aperture of the screw mounting plate and the exterior thread of the retaining ring and the screw mounting plate secures the mechanism case to the surface.

* * * * *